UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BRAN FOOD.

1,189,130.      Specification of Letters Patent.     Patented June 27, 1916.

No Drawing.      Application filed December 18, 1915. Serial No. 67,504.

*To all whom it may concern:*

Be it known that I, JOHN LEONARD KELLOGG, a citizen of the United States, residing in Battle Creek, in the county of Calhoun and State of Michigan, have invented a new and useful Improvement in the Manufacture of Bran Food, of which the following is a specification.

My invention relates to the manufacture of laxative food products from bran wholly or in combination with cereals or other healthful materials, and has for its principal object to provide bran food products of this nature in the form of loose shreds and also in the form of a shredded biscuit, which will be more digestible, palatable and appetizing than the bran foods commonly sold, and which can be eaten alone or in combination with any other cereal food, or with sugar and cream or other food elements like other cereal foods.

My invention consists of certain improvements in the process of preparing bran food products and also in bran food products, and in order that my invention may be fully understood, I shall first set forth in detail the mode in which I at present prefer to carry my invention into practice and then particularly point out in the claims the novel features of the improved process and product.

In carrying my invention into practice, I at present take the desired quantity of pure bran, preferably wheat bran, that has been thoroughly cleansed, thoroughly moisten the same and place it by preference in shallow pans. The pans I at present use are approximately 24 inches long by 12 inches wide and 6 inches deep. I then place the pans, by preference, in an ordinary steam retort and cook the bran at about 250° F. temperature for from thirty minutes to one hour.

Before or after the cooking process, I may mix with the bran any desired quantity from 5% to 50% of whole wheat or other gelatinous cereal flour or any other suitable starch-bearing material. After the bran, with or without the added starch-bearing material, is thus cooked, it is dried in the ordinary hot air drier, which leaves the cooked bran or mixture in a more or less lumpy condition. These lumps are then preferably pressed through a one-quarter inch wire mesh, so as to make the material into tiny lumps which may be about the size of a kernel of rice. These tiny lumps are then fed through shredding mills of the ordinary kind.

To make the product in the form of loose shreds, the shredding mills are preferably of such character as to make the separate shreds of varying curly and wavy ribbon-like form. To make the product in the form of biscuit, the shredding mills are of such a character as to make the separate shreds either in the same curly and wavy ribbon-like form, but preferably in the ordinary fine filamentary form.

In making the loose ribbon-like shreds, the elongated shreds are caught from the shredding mills, preferably on an ordinary conveyer belt and distributed into an ordinary flight oven, wherein they drop from one flight to another to the bottom where the shreds are finally toasted. These toasted bran shreds are then, by preference, broken into particles of crisp, short, curly and wavy ribbon-like form in which form the product is ready for the market, this form being shown in my pending application for patent filed May 17, 1915, Serial No. 28,586.

This product, owing to the described process of manufacture, is thoroughly cooked, is exceptionally palatable, digestible, appetizing and healthful, and owing to its attractive crisp, curly and wavy ribbon-like form has an exceptionally appetizing appearance.

In making the bran biscuit, the fine shreds, at present preferably used for this product, formed as above described by the shredding mills, are gathered, preferably on an endless belt and pressed into biscuit of any suitable form, which are baked in suitable ovens for about thirty minutes at a temperature of from about 450° to 500° F. A current of dried air is then by preference caused to circulate over and through the biscuits thus formed, thoroughly to dry the same, whereby the final product is formed ready for the market. These biscuits, owing to the described process of manufacture, possess an easy digestibility and are exceptionally palatable, appetizing and healthful.

It is evident that the process above described may be greatly varied in the character of its performance and in the ingredients and appliances employed, without departing from the scope or spirit of my invention, which is defined by the following claims.

I claim as my invention:

1. A process of preparing a shredded bran food, during the performance of which the bran is moistened, cooked and dried, reduced to small particles, and the particles shredded and baked or toasted.

2. A process of preparing a shredded bran food, during the performance of which the bran is moistened, cooked and dried, and starch-bearing material added thereto, the mixture reduced to small particles, and the particles shredded and baked or toasted.

3. A process of preparing a shredded bran food, during the performance of which the bran is moistened, cooked and dried, and reduced to small particles, the small particles shredded into elongated ribbon-like shreds, and the ribbon-like shreds baked or toasted.

4. A process of preparing a shredded bran food, during the performance of which the bran is moistened, cooked and dried, and reduced to small particles, the small particles shredded, the shreds molded into biscuit form and the biscuits baked or toasted.

5. A shredded bran food consisting of a mass of separate shreds.

6. A shredded bran food consisting of a mass of separate curly shreds.

7. A shredded bran food consisting of a mass of separate wavy shreds.

8. A shredded bran food consisting of a mass of separate ribbon-like shreds.

9. A shredded bran biscuit consisting of separate shreds pressed together.

JOHN LEONARD KELLOGG.